Figure 1:
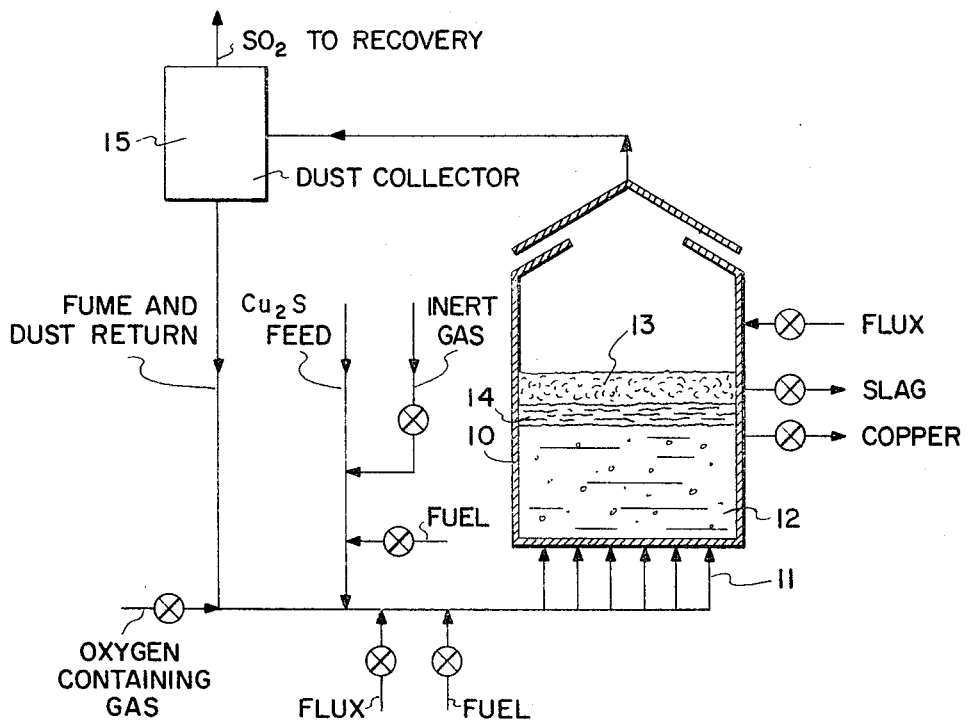

Oct. 25, 1966  H. P. MEISSNER  3,281,236
METHOD FOR COPPER REFINING
Filed July 1, 1964

INVENTOR.
HERMAN P. MEISSNER

United States Patent Office 3,281,236
Patented Oct. 25, 1966

3,281,236
METHOD FOR COPPER REFINING
Herman P. Meissner, Winchester, Mass., assignor to Arthur D. Little, Inc., Cambridge, Mass., a corporation of Massachusetts
Filed July 1, 1964, Ser. No. 379,617
16 Claims. (Cl. 75—73)

This invention relates to the refining of copper ore, and more particularly to the refining of sulfide ores.

Copper ores are primarily sulfides, although some oxide ores exist. Typically, these ores are chalcocite namely copper sulfide, and chalcopyrite, which is a mixed sulfide of copper and iron. Domestic ores contain under 2 percent copper and some even less than 1 percent copper and therefore are beneficiated by flotation. Concentrates resulting from such beneficiation typically contain about 20 percent to over 30 percent copper, 30 percent to 40 percent sulfur, and 25 percent to 35 percent iron, as well as small but economically important quantities of silver and gold, and other materials such as silica, clay, etc.

In the earlier days of the copper industry, copper in such ores was reduced to "blister" copper by a series of steps which included roasting, smelting and converting. With the development of beneficiation, it is sometimes possible to omit roasting as a separate step.

In roasting the beneficiated copper ore is heated in air without fusion in order to eliminate part of the sulfur. This step yields a product known as calcines which is a complex mixture of iron and copper sulfides and oxides, copper sulfate, silica, etc. Since only part of the sulfur contained in the concentrate is oxidized in this step, the heat generated is usually insufficient to keep the system above the ignition temperature, and therefore roasting often requires a supplying of external heat energy, such as by burning fuel mixed with the concentrates.

Smelting is typically carried out in a reverberatory furnace fired by powdered coal, gas or oil. Into this furnace are introduced the calcines together with recycled slag and copper-bearing wastes from the converter, and a suitable flux. Reverberatory furnace temperatures range from about 1100° C. to 1200° C. at the flue end, to 1400° to 1600° C. at the firing end. Usually a reducing agent is not added to the charge, and the flux used will depend upon whether the concentrate is acidic or basic. In the reverberatory furnace, fusion occurs as the charge is heated to above its melting temperature. In the melt any copper oxide present reacts with iron sulfide to form copper sulfide since the equilibrium for the following reaction lies far to the right.

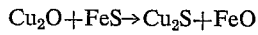

In roasting, the amount of sulfur eliminated is restricted, so the charge to the reverberatory furnace contains more than enough sulfur needed for all of the copper present to form copper sulfide. The iron oxide formed in roasting reacts with the silica flux to form a relatively low-melting silicate slag. This slag contains not only the iron silicate, but also silica, alumina and various other oxide impurities in the ore concentrates charged.

The reverberatory charge melts to form molten sulfides of copper, iron, etc., and slag. The sulfides present are miscible in each other, and form the so-called "matte" which is completely immiscible in, and heavier than the slag layer, and so the two liquids separate. The slag layer contains little dissolved copper but it may contain a few prills of copper in suspension. The long residence time in the reverberatory makes possible a reasonably complete separation of the matte and suspended copper from the slag.

Since heat is required to melt the charge, the reverberatory is fuel fired. Some further oxidation of sulfur in the charge inevitably occurs, but this is limited in extent.

The matte from the reverberatory furnace is transferred to the converter. Here the matte is mixed with a flux (typically silica) and blown with air. The iron sulfide present in the matte is converted to iron oxide which again reacts with the silica to form molten iron silicate which enters the slag layer. Converter slags tend to be high in magnetic iron oxide ($Fe_3O_4$), because of the strong oxidizing conditions which exist during converting. The presence of this magnitite tends to interfere with the separation of copper from the ore. After all the iron is oxidized, blowing is interrupted, and the slag is poured off. Air blowing is now resumed, whereupon the copper sulfide reacts with the oxygen of the air to form copper oxide which in turn reacts with more copper sulfide to form molten copper and sulfur dioxide. Most of these reactions proceed rapidly, giving a net result which may be written as

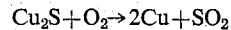

During this second stage of conversion, copper metal but no slag is formed. The overall reaction in the converter may therefore be very roughy represented as (1)
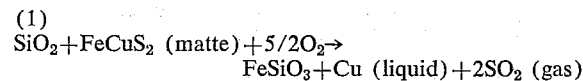

By this brief discussion of the prior art of copper refining, it will be seen that it consists of a two or three stage process requiring bulky, high-temperature equipment involving serious maintenance problems. Fuel must be supplied in the reverberatory furnace as well as to the roasting step if included in the process, and sulfur dioxide is present in the off-gases from each piece of the apparatus. The sulfur dioxide contained in the reverberatory furnace gases is dilute and not well suited to acid production.

It would be desirable to have available a process of refining copper which does not require a two or three step operation and which is capable of taking more complete advantage of the exothermic character of some of the reactions involved in the refining process. Further, it would be desirable to be able to recover the $SO_2$ produced in such purity that it would be available for acid production.

A primary object of this invention is therefore to provide a method for producing raw copper metal from copper concentrates which is a one step process. It is another object of this invention to provide a method of the character described which is capable of reducing investment costs per unit capacity. It is yet another object of this invention to provide a method for the refining of copper in which fuel costs are reduced and which in itself is essentially autogenous, making use of the exothermic characteristics of the reactions involved. It is yet another object of this invention to provide such a method which produces sulfur dioxide in a single gas stream of a character such that it is suitable for acid production. Yet another object is to provide a method which approaches a "steady state" operation, a process which would have great advantages over the present converter operation which is essentially a batch process. Again, an object is to provide a method of the character described in which the slag compositions can be controlled more readily than in standard converter operation. Another object is to reduce or even eliminate tuyere punching. Other objects of the invention will in part be obvious and will in part be apparent hereinafter.

The invention accordingly comprises the several steps and the relation of one or more of such steps with respect to each of the others, and the apparatus embodying features of construction, combination of elements, and arrangement of parts which are adapted to effect such steps, all as exemplified in the following detailed disclosure, and the scope of the invention will be indicated in the claims.

Figure 2:
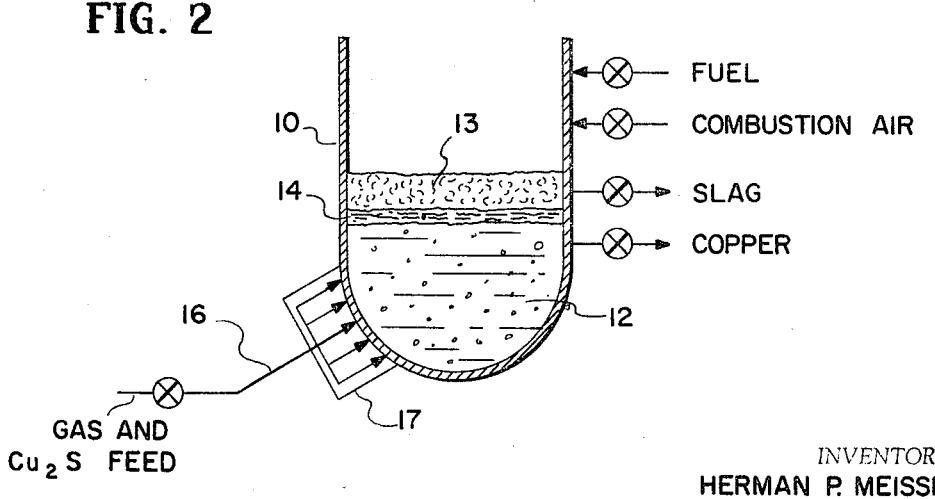

For a fuller understanding of the nature and objects of the invention, reference should be had to the following detailed description taken in conjunction with the accompanying drawing in which FIG. 1 is a diagrammatic representation of the apparatus of the invention and a flow diagram of the process steps which are carried out therein; and FIG. 2 is a modified form of the reaction chamber of the apparatus of FIG. 1.

In brief, the process of this invention for making copper comprises introducing beneath the surface of a mass or pool of molten copper, matte and slag a material containing copper sulfide, a flux and an oxygen-containing gas to bring about the reactions which yield metallic copper, slag and gaseous by-products. The net heat produced by the reactions which occur is sufficient to produce a major part, if not all, of the heat required by the process. Of course, it is within the scope of this invention to supply additional heat to the reactor by preheating the air or ore charged, or both, by enriching the air used with oxygen, or by continuously burning a suitable amount of gaseous, liquid or solid fuel within the reactor, possibly by submerged combustion in the melt. If desired, it is also possible to recover the off-gases, and to recover solids in these gases for recycling within the process or for other purposes.

Operating temperatures are preferably somewhat above the melting point of copper which is 1067° C. It is known that at these temperatures iron sulfide, copper sulfide and copper oxide have significant solubilities in molten copper, but that iron silicate and other common slag-forming ingredients have substantially zero solubility in molten copper metal.

By the practice of this invention, the reactions to form the copper are carried out in a single vessel, thus combining the two- or three-step process of the prior art. In this method, all the reactions which normally take place in the reverberatory furnace, in the smelter, and in the converter, are carried out continuously and simultaneously within a single container or reactor. Three different and immiscible liquid layers are present within the reactor, namely, slag, matte (a solution of copper and iron sulfides) and copper. The relative volume ratios of these layers can be varied over a wide range, and they will depend upon the conditions of operation. In many situations it may be preferable to operate with the smallest possible matte volume.

A number of reactions take place in this system, but it is not known in exactly what sequence they occur. Thus oxygen unites with copper to form copper oxide, and this copper oxide unites with copper sulfied to form $SO_2$ and metallic copper, or with iron sulfide to form iron oxide and copper sulfide. Alternatively, the oxygen may combine directly with copper sulfide to form copper metal and $SO_2$ or with iron sulfide to form iron oxide and $SO_2$. All of these reactions are known to take place very rapidly, and in the net operation, to evolve heat. The main overall reaction in the copper refining method of this invention (using a silica flux) is represented by Equation 1 above and is vigorously exothermal. The concentrate composition is represented for illustrative purposes in Reaction 1 as $FeCuS_2$, but the ratio of Cu to Fe may vary widely without changing the operation described in this invention. The process, of course, will also operate on physical mixtures of copper sulfides and iron sulfides.

Copper ores or copper ore concentrates may be used in the process. Thus it is possible to introduce crushed chalcocite or chalcopyrite ores directly into the process, or to use concentrates which are the result of well-known beneficiation techniques. The particle size of the ore is not critical except that it should be such that it may be entrained in a gas which is used to introduce the copper sulfide into the molten copper. Typically, the ore or concentrate will be of a particle size which permits all of it to pass through an 8-mesh sieve. However, operational conditions such as the size of the bubbles created in the molten copper bath, the size of the ports, the temperature of the operation, and the sulfide content in the bath will all contribute to a determination of the optimum particle size of the solid feed to be used.

As will be apparent from FIG. 1, it is possible to introduce the copper sulfide feed (whether ore or or concentrate, or a mixture of recycled copper oxide, sulfides and sulfates) either entrained in the oxygen-containing gas (such as air) or in an inert gas which is then mixed with the oxygen-containing gas. It is, of course, possible also to introduce this copper sulfide feed in an inert gas separately from the oxygen-containing gas into the liquid in the reactor. Some pressure, is, of course, required to overcome the hydrostatic head of fluid, depending upon the depth of immersion. The actual choice of submergence depth, gas pressure and entrance velocity will depend upon the operating conditions chosen.

The oxygen supplied to the system is, in many localities and under normal circumstances, most conveniently introduced as air. It can, however, be introduced as pure oxygen, or as a mixture of oxygen and air or as a gas which contains less oxygen than air. A portion of the necessary oxygen can be supplied by including some copper oxide or copper sulfate in the solid feed. It will be appreciated that part of the gaseous oxygen introduced into the system may not react, but may pass through the molten liquid and appear in the off-gases. The "available" oxygen is then only that which reacts, and allowance for this fact must be made when controlling the process.

It is essential for proper operation that the oxygen to solids ratio be kept in proper balance. That is, each gram atom of sulfur in the solid feed (regardless of whether it is present as FeS, $Cu_2S$, $Cu_2SO_4$, etc.) must be supplied with one gram mol of available oxygen in order that the sulfur can escape as $SO_2$ gas. Each gram atom of iron present must likewise be supplied with sufficient oxygen to form iron oxide. If too much oxygen is used, then the copper metal is oxidized to copper oxide and lost in the slag. If too little oxygen is used, then the copper sulfide (and other sulfides) are incompletely reacted, and a matte layer accumulates. A stoichiometric control should therefore preferably be exercised whereby, over an extended period, the available oxygen in the feed is precisely proportioned to the sulfur content of the solid feed.

It should be recognized that not all oxygen in the solid feed will serve as available oxygen for desulfurizing. Thus the oxygen in silica ($SiO_2$) is so strongly bound that it will not leave the silica to react with the sulfur. On the other hand, oxygen present as molecular oxygen in the air and oxygen as $Cu_2O$ and $Cu_2SO_4$ is available for desulfurizing since the following reactions will all proceed above the melting point temperature of copper, causing $SO_2$ to be evolved.

$$Cu_2S + 2Cu_2O = 6Cu + SO_2$$
$$Cu_2SO_4 + Cu_2S = 4Cu + 2SO_2$$

The ratio of available oxygen to sulfur in the ore must therefore be carefully maintained by suitable metering techniques. Despite best efforts, it will be difficult to keep the ratio of feed of sulfur in the solids to available oxygen in exact balance over extended periods of time. Adustment to restore this required balance will then be necessary from time to time by adding an excess of solids or of oxygen for an appropriate period. If removal of the copper product is intermittent, then such adjustments can conveniently be done just before such removal.

The quality of the concentrates will determine the type and amount of flux used. Since the iron in the concentrates must be removed as silicates, sufficient $SiO_2$ must be injected as flux to form a low-melting silicate. The proportions of flux used will be in accordance with well-known principles of metallurgical practice. This flux may be introduced by blowing with the concentrates. Alternatively, the flux may be introduced by other means, such as by addition directly to the top of the slag-layer.

Despite the speed with which reactions occur in this vessel, three distinct liquid phases will be present, namely, slag, matte (molten solution of copper and iron sulfides) and copper metal. These three liquids are substantially insoluble in each other. By varying the ratio of air to concentrate even only slightly, the relative volume of matte present within the reaction vessel can be readily adjusted. The proper ratio to use will depend upon the composition of the concentrate being used, and it will usually be preferable to keep the matte volume at a minimum. Further control of the relative volumes of these liquid layers is attained by controlling relative rates of tapping of these layers.

Because oxygen (e.g., in air) and concentrates are fed simultaneously and in stoichiometric proportions, the oxygen is always exposed to fresh FeS, with which it reacts vigorously. Unlike the situation in the latter stages of standard converter operation, during which the air used comes in contact only with the rather weakly oxidizing copper-copper sulfide system, the method of this invention provides for the air always to contact fresh ore, this in turn resulting in more complete usage of the oxygen and the exposure of the slag to less strongly oxidizing conditions. In consequence, the quantity of magnetite ($Fe_3O_4$) present in the slag can be materially less than in standard converter operation.

The locations at which the feed streams enter the reaction vessel are not critical. Preferably, however, the oxygen-containing gas stream and solid stream are introduced into the molten copper near the interface between the slag and copper layers (assuming a small matte layer). The molten copper metal layer is heavier than the slag, and so tends to lie below the slag.

FIG. 2 illustrates the tangential introduction of the gas and copper sulfide feed into the reaction chamber. This has the advantage of causing the solids introduced to impinge on the edge of the bubble walls formed and thus to achieve more rapid and complete dissolution. The apparatus used and the operating conditions employed (e.g., temperature, feed pressure, and ore particle size) will determine an optimum depth for any one system.

As indicated above, the process of this invention makes it possible to take advantage of the exothermic nature of the reactions involved. However, it may be necessary to supply some additional heat to the system from an external source. For example, with some ores and when the solid feed contains relatively large amounts of copper oxide and sulfate, the heat evolved will not be sufficient to operate the process at the desired temperature. In such a case, the deficit in heat required can be supplied by burning a gaseous, liquid, or powdered solid fuel within the reactor. It may be desirable to use submerged combustion in this case. The additional oxygen which must be supplied to burn the fuel is, of course, not available for the copper forming reactions. On the other hand, the products of combustion, such as CO, $CO_2$ and $H_2O$ and the like, are not detrimental to the carrying out of the method of this invention. Tuyere punching in standard prior art converter practice is necessary because the relatively cold air entering the converters causes the copper metal to solidify around the tuyeres. In the method herein described much of the reaction of the ore and air takes place at or near the tuyeres, thus keeping this region hot enough to minimize and even eliminate copper solidification at this point.

Part or all of the heat deficit may be supplied by preheating the solid feed or the oxygen-containing gas prior to introduction into the system. Induction heating is also possible, its use depending upon local circumstances. Use of oxygen to enrich the air used is still another method for keeping the system in thermal balance, since now there is less inert nitrogen present. Combinations of these techniques for heat makeup are also within the scope of this invention.

Molten copper and slag may be removed continuously or periodically through appropriate calming sections built into the reaction vessel. Withdrawal of the molten liquids will normally be accomplished through tap holes or, if the converter is so constructed that it can be tipped, by tipping the reactor. In tipping it is important always to maintain a pool of liquid copper in the reactor into which the reactants are introduced. This pool acts as a "flywheel" to level out accidental variations in compositions, temperature, etc. The slag, on the other hand, can be completely removed from time to time or continuously as desired.

Dust-laden gases coming from the vessel will contain $SO_2$, other constituents such as nitrogen, etc., unreacted particulate copper sulfide, copper oxide, some vaporized copper compounds and copper metal. Inasmuch as all of these wastes are carried in a single gas stream, it is possible to collect the solids contained therein in a dust collector, the solid materials being retained on suitable filtering surfaces such as bags.

The gases, containing a high concentration of $SO_2$, are removed and sent to a suitable recovery system such as an acid plant. Periodically, the filters which have collected the solid materials (including copper, copper sulfide and copper oxide) are treated to remove the solid materials and return these into the system as shown in FIG. 1. Thus, it is possible continuously to recover valuable copper, copper sulfide, and copper oxide, and at the same time to use the by-product $SO_2$, in an economical manner. In contrast to prior practice, the recovery of the solid materials is relatively less expensive in the process of this invention because of the smaller gas volumes involved.

As shown in FIG. 1 this invention may be carried out in apparatus comprising a reaction vessel 10; tuyeres 11 adapted to deliver the gaseous and solid feed to the molten copper pool 12; conduits suitably valve-controlled to introduce the $Cu_2S$ source and oxygen source into the tuyeres, as well as any inert gaseous carrier, fuel, combustion oxygen or air and flux; suitably valve-controlled conduit means for removing slag 13 and product copper; and a conduit system for removing the fumes to a dust collector 15 and for returning solid matter to the reaction vessel. A modification of the apparatus, shown in FIG. 2, incorporates a conduit system 16 and tuyeres 17 designed to introduce the copper sulfide particles entrained in a suitable gas tangentially into the molten copper pool. In the diagrammatic representations of FIGURES 1 and 2, the matte layer 14 is shown as a distinct layer. However, it may be transient and hence it may not always be identifiable.

The reaction vessel 10 may be of any well-known type such as a Bessemer-type converter or a Pierce-Smith type converter. The tuyeres may be located at the converter base or on the side. Lance blowing of the feed downward into the molten copper may also be used. The primary consideration in introducing the feed into the molten copper pool is that the depth of introduction or blowing with respect to the surface of the molten pool be sufficient to obtain optimum operation as discussed above. The reaction vessel may be stationary or tippable. If it is stationary suitable means, such as a siphon tap and well, must be provided for withdrawing the molten copper.

It will be seen from the foregoing description that the process of this invention makes it possible to carry out the production of copper in a single reaction vessel in an essentially one-step process. The process takes advantage of the exothermic characteristics of the overall reactions involved to balance the heat input that is required, thus eliminating or materially reducing the need for an external heat source. Moreover, recovery of by-products, both gaseous and solid, is economical and easy; and the process is flexible with respect to operational conditions, to the quality of copper sulfide feed, as well as to the adjustment of temperatures and reaction conditions.

It will be thus seen that the objects set forth above, among those made apparent from the preceding description, are efficiently attained and, since certain changes may be made in carrying out the above process and in the constructions set forth without departing from the scope of the invention as defined in the appended claims, it is intended that all matter contained in the above description or shown in the accompanying drawings shall be interpreted as illustrative and not in a limiting sense.

I claim:

1. A method of producing copper, characterized by the step of introducing into a molten system maintained at a temperature above the melting point of copper and comprising slag, matte and copper, a flux, a sulfide ore containing copper, and an oxygen-containing gas, the introducing of said ore and gas being accomplished beneath the surface of said molten copper whereupon reactions occur yielding metallic copper, slag and gaseous by-products, the exothermic reactions providing at least a portion of the heat required in the process; the quantity of oxygen present in said gas being that which is sufficient to convert all of the sulfur present to $SO_2$ and all of the iron present in said ore to iron oxides.

2. A method in accordance wtih claim 1 wherein said ore is entrained in said oxygen-containing gas.

3. A method in accordance with claim 1 wherein said ore is entrained in an inert gaseous carrier.

4. A method in accordance with claim 1 wherein said ore and said oxygen-containing gas are introduced into said molten system near the interface between said copper and said slag.

5. A method of producing copper from a sulfide ore containing copper, comprising the steps of
  (a) introducing into a molten system maintained at a temperature above the melting point of copper and comprising slag, matte and copper, said sulfide ore and an oxygen source at least a portion of which is in the form of molecular oxygen, the quantity of oxygen present in said oxygen source being that which is sufficient to convert all of the sulfur present to $SO_2$ and all of the iron present to iron oxide, said introducing of said ore and said oxygen source being accomplished beneath the surface of said molten copper whereupon reactions occur yielding metallic copper, slag and gaseous by-products carrying entrained solid matter;
  (b) adding to said molten system a flux for reaction with any iron oxides present in said system;
  (c) removing said gaseous by-products and any entrained solid matter;
  (d) collecting said solid matter;
  (e) returning said solid matter to said molten system; and
  (f) removing said slag and a portion of said molten copper substantially equal to the copper introduced in said ore.

6. A method in accordance with claim 5 wherein said flux is silica.

7. A method in accordance with claim 5 wherein said oxygen source is air.

8. A method in accordance with claim 5 wherein a portion of said oxygen source comprises copper oxides.

9. A method in accordance with claim 5 wherein a portion of said oxygen source is a copper sulfate.

10. A method of producing copper from a sulfide ore containing copper, comprising the steps of
  (a) introducing into a molten system maintained at a temperature above the melting point of copper and comprising slag, matte and copper, said sulfide ore and an oxygen source at least a portion of which is in the form of molecular oxygen, the quantity of oxygen present in said oxygen source being that which is sufficient to convert all of the sulfur present to $SO_2$ and all of the iron present to iron oxide, said introducing of said ore and said oxygen source being accomplished beneath the surface of said molten copper whereupon reactions occur yielding metallic copper, slag and gaseous by-products carrying entrained solid matter:
  (b) adding to said molten system a flux for reaction with any iron oxides present in said system;
  (c) removing said gaseous by-products and entrained solid matter;
  (d) supplying to said molten system a quantity of heat in addition to that generated by the exothermic reactions taking place in said molten system; and
  (e) removing said slag and a portion of said molten copper substantially equal to the copper introduced in said ore.

11. A method in accordance with claim 10 wherein said supplying heat comprises heating said oxygen source.

12. A method in accordance with claim 10 wherein said supplying heat comprises heating said ore prior to its introduction into said molten system.

13. A method in accordance with claim 10 wherein said supplying heat comprises combusting a fuel and oxygen source within said molten system.

14. Process in accordance with claim 10 wherein said supplying heat comprises combusting a fuel and oxygen source within the enclosure defining said molten system.

15. A method of producing copper from a sulfide ore containing copper, comprising the steps of
  (a) introducing into a molten system maintained at a temperature above the melting point of copper and comprising slag, matte and copper, said sulfide ore and an oxygen source at least a portion of which is in the form of molecular oxygen, said introducing of said ore and oxygen source being accomplished beneath the surface of said molten copper whereupon reactions occur yielding metallic copper, slag and gaseous by-products carrying entrained solid matter;
  (b) adding to said molten system a flux for reaction with any iron oxides present in said system;
  (c) removing said gaseous by-products and entrained solid matter; and
  (d) removing said slag and a portion of said molten copper substantially equal to the copper introduced in said ore;
the amount of available oxygen present in said oxygen source being that which is just sufficient to convert all of the sulfur present to $SO_2$ and all of the iron present in said ore to iron oxides.

16. A method in accordance with claim 15 wherein said ore and said oxygen source are introduced tangentially into said molten system.

References Cited by the Examiner

UNITED STATES PATENTS 184,988    12/1876    Sluder _____ 75—73

(Other references on following page)

UNITED STATES PATENTS

| | | | |
|---|---|---|---|
| 496,032 | 4/1893 | Allen | 75—73 |
| 789,648 | 5/1905 | Baggaley | 75—73 X |
| 1,063,486 | 6/1913 | Wierum | 75—73 |
| 1,817,043 | 8/1931 | Stout et al. | 75—73 |
| 1,822,588 | 9/1931 | Fowler et al. | 75—72 |
| 1,888,164 | 11/1932 | Freeman | 75—72 X |
| 1,922,301 | 8/1933 | Kekich | 75—75 |
| 2,105,574 | 1/1938 | Wing | 75—73 |
| 2,261,895 | 11/1941 | Zippler | 266—11 |
| 2,298,139 | 10/1942 | Long et al. | 75—88 |
| 2,768,891 | 10/1956 | Gardner et al. | 75—72 |
| 2,784,081 | 3/1957 | Greenawalt | 75—72 |
| 3,139,336 | 6/1964 | Dean | 75—75 |
| 3,171,877 | 3/1965 | Thring | 266—11 |
| 3,198,871 | 8/1965 | Westeren et al. | 75—65 X |

DAVID L. RECK, *Primary Examiner.*

H. W. TARRING, *Assistant Examiner.*